(12) United States Patent
Mouette et al.

(10) Patent No.: US 7,472,783 B2
(45) Date of Patent: Jan. 6, 2009

(54) DEVICE FOR ORIENTING BULK-FED TUBULAR PREFORMS

(75) Inventors: Patrick Mouette, Octeville sur Mer (FR); Alain Charpentier, Octeville sur Mer (FR); Philippe Derouault, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 11/885,378

(22) PCT Filed: Feb. 28, 2006

(86) PCT No.: PCT/FR2006/000453

§ 371 (c)(1),
(2), (4) Date: Oct. 17, 2007

(87) PCT Pub. No.: WO2006/092498

PCT Pub. Date: Sep. 8, 2006

(65) Prior Publication Data

US 2008/0142337 A1   Jun. 19, 2008

(30) Foreign Application Priority Data

Mar. 2, 2005   (FR) .................................. 05 02120

(51) Int. Cl.
*B65G 47/24* (2006.01)
(52) U.S. Cl. ...................... 198/415; 198/455
(58) Field of Classification Search ................ 198/411, 198/415, 454, 455, 400
See application file for complete search history.

(56) References Cited

U.S. PATENT DOCUMENTS

| | | | | |
|---|---|---|---|---|
| 2,560,995 A | * | 7/1951 | Stiles | ........................ 198/455 |
| 3,722,657 A | | 3/1973 | Kiwiet et al. | |
| 3,780,849 A | * | 12/1973 | Hoehl et al. | ................ 198/444 |
| 4,085,839 A | | 4/1978 | Crawford et al. | |
| 5,058,749 A | * | 10/1991 | Jong | ........................ 198/415 |
| 6,390,766 B1 | | 5/2002 | Craig et al. | |

FOREIGN PATENT DOCUMENTS

| | | |
|---|---|---|
| FR | 2 499 032 A | 8/1982 |
| GB | 2 224 986 A | 5/1990 |

* cited by examiner

*Primary Examiner*—James R Bidwell
(74) *Attorney, Agent, or Firm*—Sughrue Mion, PLLC

(57) ABSTRACT

A device for orienting tubular preforms which are fed in bulk by a supply device, including two continuous endless conveyors which are disposed side by side and which are equipped respectively with two parallel lines which are separated horizontally from one another by a distance that is greater than the largest cross-sectional dimension of the preforms. According to the invention, the preform-supply device is disposed above one end of the two conveyors. The two conveyors are moved by drive device in opposing directions in order to pivot any preforms that arrive positioned sideways across the conveyors and to drop the longitudinally-oriented preforms into the space between the two conveyors. The orienting device also includes an endless belt for collecting preforms, which extends beneath the two conveyors parallel thereto and which is used to collect and move the horizontally-laid longitudinally-aligned preforms one after the other.

10 Claims, 2 Drawing Sheets

DEVICE FOR ORIENTING BULK-FED TUBULAR PREFORMS

TECHNICAL FIELD

The present invention relates in general to the field of the manufacture of containers (particularly various forms of bottle or the like) made of thermoplastic, such as PET, by blow-molding or stretch-blow-molding preforms and, more specifically, it relates to improvements made to preform-feed devices situated at the beginning of the plants used to manufacture such containers. More specifically still, the invention relates to the feeding of tubular preforms, that is to say of preforms of cylindrical and elongate overall shape, the length of the body of which is markedly greater than the diameter (for example at least three or four times the diameter).

BACKGROUND ART

The preforms are introduced into the plant one after another in a vertical position, neck uppermost, pushed to cause them to enter a gripping and loading member of the plant, such as a notched horizontal wheel. For correct feed, it is necessary not only for the preforms to be pushed positively into the gripper member, but also for them to arrive at this member without any discontinuity, all arranged in the required vertical position, and without the preforms being nested inside one another.

Commonly, in order for all these conditions to be met simultaneously, the preforms, contained in a loading hopper, are taken therefrom via elevator, and are then conveyed to the start of the plant under gravity using a chute conveyor in the form of guides; at the top of this chute conveyor there is an orientation device comprising an input hopper into which the preforms are tipped in bulk from the elevator, together with the actual orientation mechanism proper (commonly consisting of orienting rollers) and various elements intended for introducing the preforms into the chute conveyor one by one and for eliminating any preforms nested inside one another, etc.

In very high capacity plants capable of producing several thousand, if not several tens of thousand containers per hour, the device for orienting the preforms is not only positioned at a very great height but is also very large in size, and its opening may be situated at a height of several meters. It is therefore necessary for it to be associated with appropriate equipment (walkway with guard rails, ladder, etc.) so that the supervisory and maintenance personnel can have perfectly safe access to the orientation device and to the devices associated therewith (the elevator connecting the loading hopper to the input hopper, etc.) which are located at a height. This equipment, generally made of metal, is very expensive and very bulky. Furthermore, the preform feed device arranged in this way occupies a great deal of space.

What is more, the chute conveyor essentially consists of two parallel guides on which the preforms rest via their flange. Owing to the inclination of the guides and because of the approximately horizontal position of the flanges due to the fact that the preforms are situated generally vertically the flanges rest on the guides at just two symmetrically opposed points on their periphery, and therefore in a way that is not very stable; what this means is that the movement of the preforms under gravity along the guides is uneven because of non-constant friction and is accompanied by a swinging of the preforms, this being something that may have consequences detrimental to correct and uniform operation of the plant (as it may cause preforms to jam, to be ejected, etc.).

The users of such plants therefore have a pressing need for feed devices which are less expensive and less bulky while at the same time are capable of moving the preforms along more uniformally and without the possibility of incidents.

It is precisely an object of the invention to meet these requirements and to propose means which are better able than the current devices to meet the various requirements of current practice.

SUMMARY OF THE INVENTION

To these ends, the invention proposes an orientation device for orienting tubular performs delivered in bulk by feed means, which orientation device, being arranged according to the invention, wherein it comprises:

two continuous endless conveyors positioned side by side and each respectively having two strands which run substantially parallel to one another and which are separated from one another horizontally by a distance greater than the longest transverse dimension of the preforms, the preform feed means being situated above these two conveyors and near one of their ends, these two conveyors being driven by drive means in opposite directions to one another so as to cause those of the preforms which arrive crosswise on the endless conveyors to pivot and drop, oriented longitudinally, into the space between the two endless conveyors, and an endless collecting belt for collecting the preforms running under the aforementioned two endless conveyors and parallel thereto to collect the preforms and move them along, lying down longitudinally aligned one after the other.

It should be emphasized that the orientation device proposed by the invention is not a complete feed device but constitutes a device that needs to be associated with other components or devices (feed hopper, unscrambler for separating the nested preforms, preform spacer, means for picking up the preforms lying down longitudinally aligned one after the other, etc.) all of which together forms an actual feed device.

Furthermore, the orientation device according to the invention makes it possible to dispense with an elevator system and the preform feed means may consist of a storage member, such as a loading hopper, into which the preforms are placed in bulk and from which they drop under gravity onto the orientation device. Alternatively, the feed means may consist of a storage member, such as a loading hopper, situated upstream of the device, and of an intermediate member (belt or the like) which conveys the preforms from the storage member above the endless conveyors driven in opposite directions from one another.

The orientation device according to the invention offers the major advantage of being entirely situated at a constant height, and can therefore be positioned within reach of an individual (for example at a height of the order of 1 m to 1.5 m), allowing the personnel to monitor the operation and if necessary intervene on the device while remaining on the floor on which the plant rests. The highest part of the entire plant implementing a device such as this is the upper opening of the loading hopper via which the preforms are introduced when the aforementioned feed means comprise such a hopper. When they do, in any event, said upper opening is situated at a level appreciably lower than the uppermost level of the elevators of the prior art and, once again, the supervisory and maintenance personnel no longer have to move around at great heights as they did in devices of the prior art. What this means is that the overall structure can be considerably simplified because most of the safety equipment (platform, ladder, etc.) can be omitted or scaled-down. This then means an appreciable reduction in the overall cost of the plant.

Another significant consequence of the lowered arrangement of the device according to the invention lies in the vertical space saving, which allows it to be installed in premises which do not necessarily have a great deal of head room, once again making it possible to reduce the costs of erecting the building that houses the plant.

Another advantage of the device according to the invention stems from its operating efficiency: lying-down preforms are moved along positively by the conveyors and the belt, thus setting aside any disadvantages inherent to the uneven friction between the flanges of the preforms as they slide along the guides merely under the effect of gravity.

In order for the preforms which have arrived on the belt to be removed quickly so that they do not impede the arrival of the next preforms that are being straightened on the two endless conveyors and in order ultimately to ensure satisfactory operation of the device, it is advantageous for the endless belt to have a speed appreciably higher than that of the two endless conveyors, and in particular, than that of the conveyor running in the same direction.

To simplify the overall arrangement of the device, provision may be made for the two endless conveyors to be driven in opposite directions from one and the same drive unit; likewise, provision may be made for the two endless conveyors to be driven at appreciably equal speeds, meaning that a simple movement reverser needs to be present when they are both driven from the same drive unit.

In a relatively compact practical embodiment, it is advantageous for each endless conveyor to be arranged vertically and for the aforementioned parallel strands to be the respective top strands of the two conveyors, so that the supervisory and maintenance personnel can gain easy access to the central region of the device.

Although there are many conceivable ways in which the conveyors may be embodied, it is, however, simpler, at least in most of the currently conceivable applications, for the two endless conveyors to be endless belts or conveyor belts. In this case, to ensure that all the preforms do indeed drop centrally onto the collecting belt and to prevent them from rolling off outward, it is advantageous for the respective top strands of the two endless conveyors to be inclined transversely toward one another.

In isolation or, advantageously, in addition to the aforementioned provision when this is implemented, it is also possible to anticipate for the two endless conveyors to be externally bordered by respective casings able to prevent the preforms from falling off the device.

In order for the preforms to be brought into satisfactory alignment by the device, it is appropriate for the mutual separation of the two conveyors to be slightly greater than the transverse dimension of the preforms. Now, preforms of various shape and/or size and, in particular, preforms of different transverse dimensions may be needed according to the size and/or the shape of the containers that are to be manufactured. Hence, in order usefully to broaden the scope of the orientation device and make it capable of processing a broad spectrum of preform types, provision may be made for at least one of the two endless conveyors to be supported in such a way that it can move transversely so that the separation between the two endless conveyors can be adjusted according to the transverse dimension of the preforms that are to be processed.

Since the preforms, downstream of the orientation device, need to be spaced apart from one another before they are picked up by an appropriate device (for example a screw that drives them toward a loading wheel), it is advantageous for the preforms, as soon as they have been oriented, to begin to be spaced apart. To do this, in a simple way it is possible to anticipate for the endless collecting belt to consist of several successive endless belts having increasing respective speeds so as to increase the spacing between the successive preforms so as to make it easier for them to be toppled over by a downstream system without interfering with one another, it then being possible for the belt to extend beyond the endless conveyors if necessary. In this case, in order, however, for the device not to be excessively long, it is advantageously possible to contrive for the transition between the first and second endless belts in particular to be located between the two endless conveyors.

BRIEF DESCRIPTION OF THE DRAWINGS

The invention will be better understood from reading the detailed description which follows of certain preferred embodiments which are given solely by way of purely illustrative example. In this description, reference will be made to the attached drawings in which:

FIG. 1A is a schematic end-on view of the device of FIG. 1, to illustrate a preferred embodiment thereof.

DESCRIPTION OF THE PREFERRED
EMBODIMENT OF THE INVENTION

Figure 1:
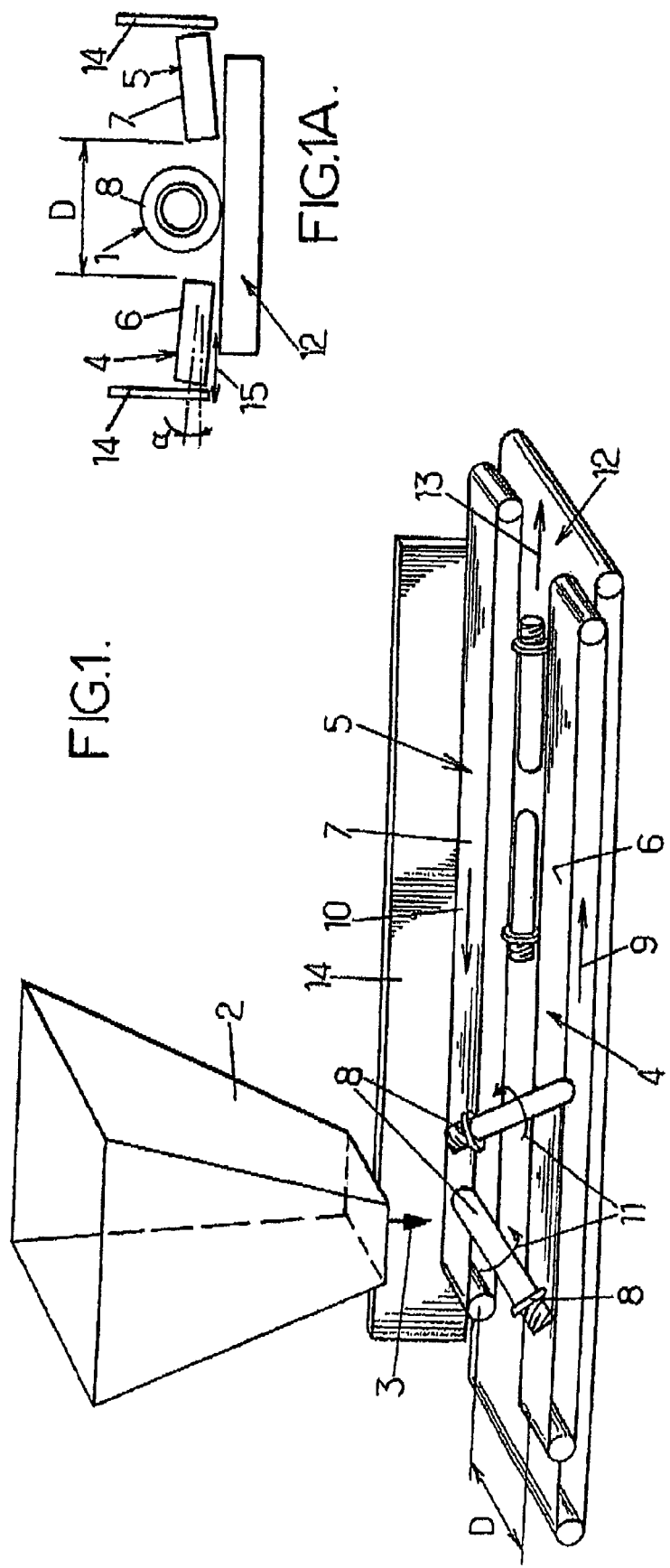
FIG. 1 is a highly schematic view, in perspective from the side, of one embodiment of a preform orientation device arranged according to the invention.

Reference is made first of all to FIG. 1 which very schematically shows an orientation device able to orient tubular preforms 1 delivered in bulk by feed means 2 which may comprise a loading hopper or may directly consist of such a hopper illustrated in FIG. 1 (the dropping of the preforms 1 as they leave the hopper situated at the base thereof is depicted diagrammatically by the arrow 3).

The orientation device comprises:
two endless conveyors 4, 5 which are positioned side by side and each respectively have two strands 6 and 7 running substantially parallel to one another; the two strands 6 and 7 of the conveyors are horizontally separated from one another by a distance D which is greater, without exceeding it excessively, however, than the longest transverse dimension of the preforms, or in other words, in practice, than the diameter of the flange 8 of the preforms; the hopper which constitutes the preform feed means 2 is situated above these two conveyors 4, 5 near one of their ends (their left-hand end in the depiction of FIG. 1); furthermore, the two endless conveyors 4, 5 are driven, by drive means which are not depicted, in opposite directions to one another (which directions are depicted diagrammatically by two arrows referenced 9 and 10 respectively) so as to cause those of the preforms 1 which fall crosswise onto the endless conveyors 4, 5 to pivot (arrows 11) and drop, oriented longitudinally, into the space between these two conveyors; and an endless collecting belt 12 running under the space between the two endless conveyors 4, 5 and parallel thereto to collect the preforms 1 and move them along, lying down longitudinally aligned one after the other (the direction of travel of the top strand of the belt 12 is depicted schematically by the arrow 13).

In a simple way, the two endless conveyors 4, 5 are driven in opposite directions at appreciably equal speeds, which means that they can be driven off one and the same drive unit connected to a simple direction-reversing mechanism.

In order to ensure that the device operates reliably, it is desirable for the endless belt 12 to have a speed appreciably higher than that of the two endless conveyors 4, 5 so that the preforms that arrive on the belt 12 are removed quickly, preventing the preforms from falling onto one another on the belt.

Figure 2:
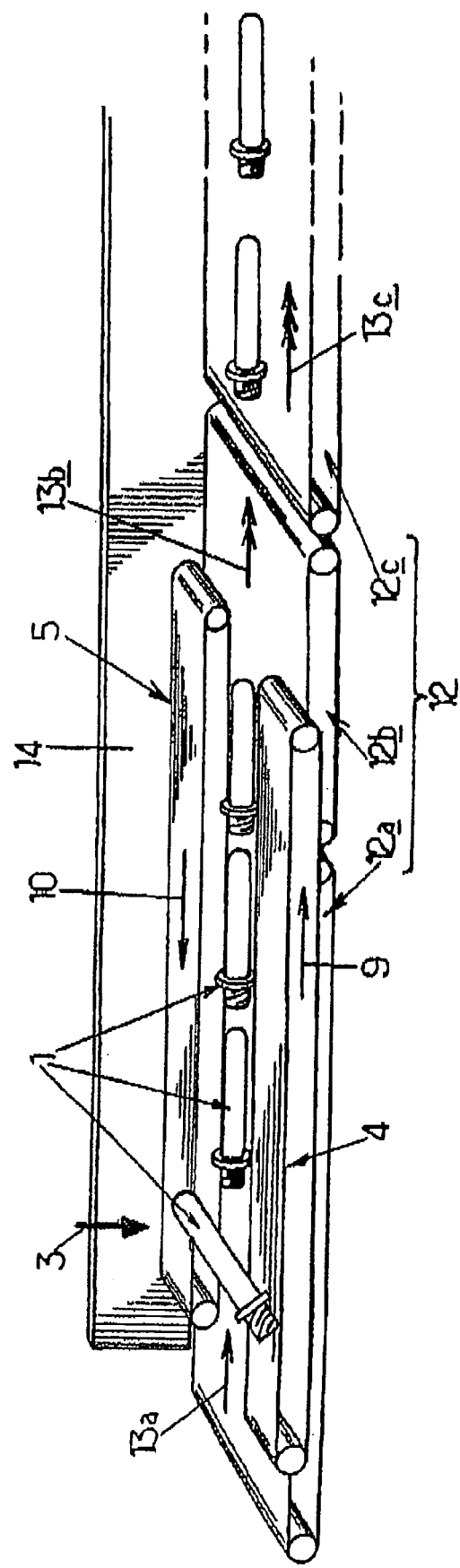
FIG. 2 is a highly schematic view of a preferred alternative embodiment of the devices of FIGS. 1 and 1A.

Although there are various conceivable arrangements of the two endless conveyors 4, 5, the solution that seems best suited on account of the transverse compactness it affords is for each endless conveyor 4, 5 to be arranged vertically and for the aforementioned parallel strands 6 and 7 to be the respective top strands of the two conveyors, as illustrated in FIGS. 1 and 2. Under such conditions, the supervisory and maintenance personnel can gain easy access the central region of the device.

Each of the conveyors 4, 5 may be equipped with a conveying member of any kind: for example a simple chain or chain equipped with protruding driving elements, or even a simple cable equipped with protruding driving elements. However, in an embodiment that is preferred in practice and illustrated in FIG. 1, the two endless conveyors 4, 5 are equipped with a conveying member in the form of a flat strip and are therefore arranged as endless belts or conveyor belts. In this case, it is advantageous, as illustrated in FIG. 1A, for the respective top strands 6 and 7 of the two conveyors 4, 5 to be inclined transversely toward one another (angle α in FIG. 1A): the preforms 1 which drop crosswise onto these top strands 6 and 7 are then more easily returned to the middle and have less of a tendency to fall off the conveyors.

Still with a view to preventing the preforms from falling off the conveyors, it is possible to envision the two endless conveyors 4, 5 being externally bordered by respective casings 14 (just one of which is drawn in FIG. 1), it being possible for this measure to be taken alone, or in conjunction with the previous measure as illustrated in FIG. 1A.

In a very attractive alternative embodiment, it is possible to contrive for at least one of the two endless conveyors 4, 5 to be supported in such a way that it can move transversely (which possibility of movement is depicted schematically by the double-headed arrow 15 in FIG. 1A) so that the separation D between the two endless conveyors can be adjusted according to the transverse dimension of the preforms; as an option, the two conveyors may be moved symmetrically so that they remain positioned symmetrically with respect to the central axis of the collecting belt 12. This measure allows the device to be adapted to process preforms of varying transverse dimensions and/or shapes, and thus broadens its scope.

In preparation for spacing the successive preforms apart at constant separations so that they can be loaded into the start of the container manufacturing plant, it is advantageous to make use of the presence of the belt 12 in order to begin here to space the preforms apart. To do this, as illustrated schematically in FIG. 2, provision is made for the belt 12 to consist of several successive endless belts 12a, 12b, 12c, etc. having increasing respective speeds (symbolized by the arrows 13a, 13b, 13c, etc. increasing numbers of arrow heads) so as to make it easier for them to be toppled over by a downstream system without interfering with one another, it then being possible for the belt 12 to extend beyond the two conveyors 4, 5. In order, however, not to lead to an excessive lengthening of the plant, it is possible to contrive for the transition between the first and second endless belts 12a, 12b in particular, to be located between the two endless conveyors 4, 5.

As was explained above, the preforms are introduced into the container manufacturing plant in a vertical position, neck uppermost. As the orientation device according to the invention delivers the preforms in a lying-down position, it is necessary, downstream, to provide a straightening-up device able to stand the preforms up into a vertical position, neck uppermost, and which does so irrespective of the orientation with which the preform is delivered by the orientation device (neck first or neck last, with respect to the direction of travel of the belt 12). There are many technical solutions known to those skilled in the art that can be adopted in order to do this.

Furthermore, and again as envisioned above, the feed means 2, instead of consisting of a hopper as illustrated in FIG. 1, may consist of a storage member, such as a loading hopper, situated upstream of the device, and of an intermediate member (belt or the like) which carries the preforms from the storage member over the endless conveyors driven in opposite directions to one another.

The invention claimed is:

1. An orientation device for orienting tubular preforms delivered in bulk by feed means, wherein it comprises:
   two continuous endless conveyors positioned side by side and each respectively having two strands which run substantially parallel to one another and which are separated from one another horizontally by a distance greater than the longest transverse dimension of the preforms, the preform feed means being situated above these two endless conveyors and near one of their ends, these two conveyors being driven by drive means in opposite directions to one another so as to cause those of the preforms which arrive crosswise on the endless conveyors to pivot and drop, oriented longitudinally, into the space between the two endless conveyors, and
   an endless collecting belt for collecting the preforms running under the aforementioned two endless conveyors and parallel thereto to collect the preforms and move them along, lying down longitudinally aligned one after the other.

2. The orientation device as claimed in claim 1, wherein the endless belt has a speed appreciably higher than that of the two endless conveyors.

3. The orientation device as claimed in claim 1, wherein the two endless conveyors are driven in opposite directions at appreciably equal speeds.

4. The orientation device as claimed in claim 1, wherein each endless conveyor is arranged vertically and in that the aforementioned parallel strands are the respective top strands of the two conveyors.

5. The orientation device as claimed in claim 1, wherein the two endless conveyors are endless belts or conveyor belts.

6. The orientation device as claimed in claim 5, wherein the respective top strands of the two endless conveyors are inclined transversely toward one another.

7. The orientation device as claimed in claim 1, wherein the two endless conveyors are externally bordered by respective casings able to prevent the preforms from falling off the device.

8. The orientation device as claimed in claim 1, wherein at least one of the two endless conveyors is supported in such a way that it can move transversely so that the separation between the two endless conveyors can be adjusted according to the transverse dimension of the preforms.

9. The orientation device as claimed in claim 1, wherein the endless collecting belt consists of several successive endless belts having increasing respective speeds so as to increase the spacing between the successive preforms so as to make it easier for them to be toppled over by a downstream system without interfering with one another.

10. The orientation device as claimed in claim 9, wherein the transition between the first and second endless belts is located between the two endless conveyors.

* * * * *